C. M. SPANGLER.
UNIVERSAL JOINT FOR COUPLING SHAFTS.
APPLICATION FILED DEC. 16, 1921.

1,429,980.    Patented Sept. 26, 1922.

Inventor,
Charles M. Spangler
By [signature]
His Atty.

Patented Sept. 26, 1922.

1,429,980

UNITED STATES PATENT OFFICE.

CHARLES M. SPANGLER, OF EMPORIUM, PENNSYLVANIA.

UNIVERSAL JOINT FOR COUPLING SHAFTS.

Continuation of application Serial No. 464,066, filed April 25, 1921. Patent No. 1,407,445. This application filed December 16, 1921. Serial No. 522,786.

*To all whom it may concern:*

Be it known that I, CHARLES M. SPANGLER, a citizen of the United States, residing at Emporium, in the county of Cameron and State of Pennsylvania, have invented certain new and useful Improvements in Universal Joints for Coupling Shafts, of which the following is a specification.

This invention relates to universal joints for coupling shafts in factories or on automobiles, or wherever such a joint is useful.

My invention is an improvement on that general class of universal joints comprising heads provided with intermeshing teeth and arranged in a casing or housing which encloses and protects said teeth while permitting the heads to be relatively tilted.

The present improvements embody, first, a grease or lubricant reservoir in one of the heads, together with a suitable duct for introducing the lubricant thereto and a cap or closure for said duct; second, an improved combination of the casing or housing with the heads whereby one of them is rotatably engaged with the casing or housing and the other is free to tilt while also being packed so that the lubricant will escape with difficulty; third, an improved dust cap held to the casing by a spring pressure in a novel manner which minimizes the likelihood of escape of the lubricant and excludes dust therefrom.

Except for the provision of the additional improvement of the dust cap, the present application is the same as my application Serial No. 464,066, filed April 25, 1921, now patent No. 1,407,445, granted Feb. 21, 1922, and is a continuation thereof.

The invention comprises those novel features and combinations of parts appearing hereinafter, and which are disclosed in the accompanying drawings and recited in the appended claims, but it to be understood that the invention is susceptible of modification without departing from the spirit of the improvements.

Figure 1:
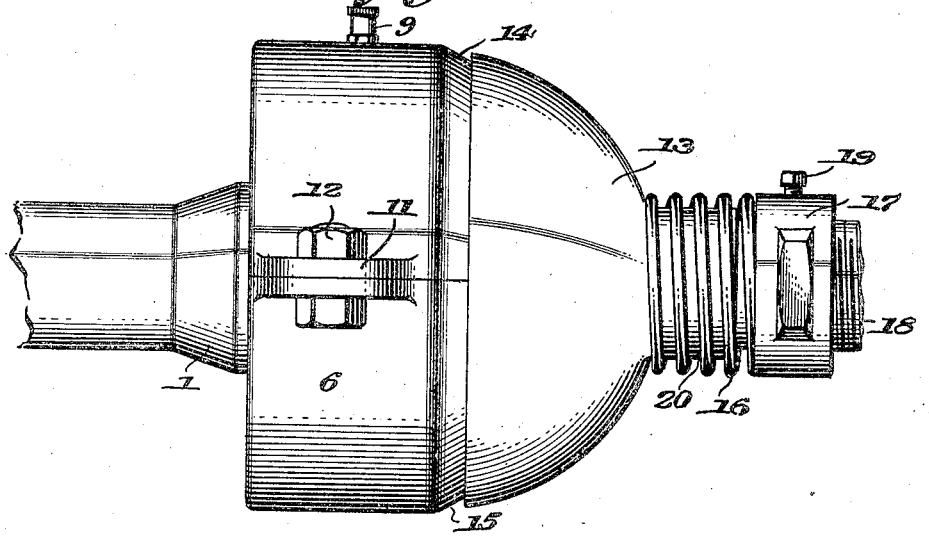
Figure 2:
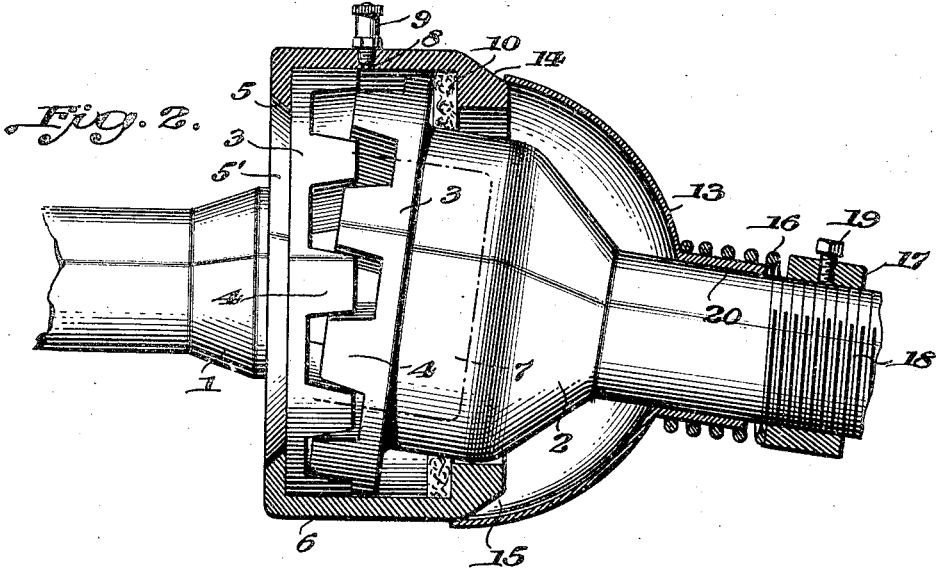

In the accompanying drawings:

Figure 1 is a side elevation with the coupling heads or members arranged in alinement; and Fig. 2 is a sectional view showing the heads in full line at an angle to each other.

The present invention may be used wherever a universal shaft coupling is required for the purpose of driving one shaft from another, whether the shafts be at an angle to each other, or, arranged in a straight line relationship. The invention being susceptible of either use, it is to be understood that while it is designated a "universal" joint, it may be employed in any relationship of shafting to which it is adapted. The members or parts of the joint may be provided with hubs of various shapes and sizes according to the use to which the joint is to be put; similarly, any desired number of teeth may be used on the coupling heads.

The respective heads or parts of the coupling are shown at 1 and 2, each being provided with a peripheral flange 3 and having a flat end or face from which the coupling teeth 4 project. These teeth radiate from the faces of the heads and taper from their outer to their inner ends, being wider at their outer ends than at their inner ends, and they are also beveled on their sides, being narrowest at their inner faces.

The part 1 is provided with an annular groove 5 of which the flange 3 forms one wall, the other wall 5' being disposed at an angle thereto, which may be any desired angle although an angle of 45° is illustrated in Fig. 2. The groove 5 provides for holding the casing 6, hereinafter described, on the head 1.

The head 2 is provided with a grease or lubricant reservoir 7 which is a concavity in the face of said head 2 where said face is disposed opposite the solid face of the head 1, said cavity extending into the head well back of the teeth 4 thereof. The solid face of the head 1 tends to retain the grease in the reservoir 7 so that it will not work out therefrom too rapidly. A suitable duct 8 leads from the exterior of the casing 6 to the reservoir 7 to enable the latter to be replenished with grease or other lubricant; the duct is normally closed by a cap or closure 9.

A gasket 10, which may be of felt, is contained within the casing or housing 6 and fits snugly around the head 2 to minimize the escape of the grease or lubricant from the casing.

The casing 6 is formed in two parts or sections, which are duplicates, said sections each being semi-circular and provided with ears 11 located on opposite sides thereof which are detachably connected by bolts and nuts 12. The casing 6 is of sufficient width to permit the head 2 to tilt therein.

As thus far described the invention is a division of Serial No. 464,066, filed April 25, 1921.

I have provided an additional improvement embodying a substantially semi-spherical metallic shell 13 which is of a size adapting it to overlap the beveled side 14 of the casing 6 regardless of the angle assumed by the head 2. The shell 13 houses and protects the closure 9 and, by covering the opening 15 in the casing 6, excludes dust and foreign material therefrom and also minimizes the escape of the lubricant. To hold the dust cap 13 up against the beveled part 14, there is provided an expansion coil spring 16 which is interposed between the cap 13 and a set collar 17 which has internal screw threads engaging threads 18 on the shaft carrying the head 2. A set screw 19 carried by the collar 17 enables said collar to be located in adjusted position. By turning the collar and clamping it, any desired tension may be put on spring 16 to hold the cap 13 as tightly or loosely against the beveled end 14 as may be desired. Preferably, the cap 13 is provided with a sleeve 20 which surrounds and slides on the shaft.

Claims:

1. In a universal joint, the combination of joint or coupling members respectively provided with teeth and freely movable to assume different relationships to each other and a casing or housing for the coupled parts of said joint, one of said coupled parts being provided with a lubricant reservoir in its end extending into said member well back of the teeth thereof from which the lubricant can work out between the teeth.

2. In a universal joint, the combination of disconnected joint or coupling members respectively provided with shafts and having teeth, said teeth being arranged for intermeshing, one of the coupled members being provided with a lubricant reservoir in its end extending into said member well back of the teeth thereof from which the lubricant can work out between the teeth, a casing or housing for the coupled parts of said joint, said casing being carried by one of said coupling members and having sufficient internal space to permit bodily tilting or shifting of the other coupled member and provided with an external beveled end, a cup-shaped dust cap having a sleeve mounted to slide on the shaft of said tiltable member and having its edge bearing on the beveled end of the casing, a gasket located between the end of the casing and the tiltable member, a coil spring surrounding the shaft of the tiltable member and bearing on the dust cap, and a collar having a screw threaded connection with the exterior of the shaft of the tiltable member, said collar serving to adjust the tension of the spring by adjustment along the shaft of the tiltable member, whereby any desired tension may be applied to the spring to cause the mouth of the cup-shaped member to properly bear on the beveled end of the casing.

In testimony whereof I affix my signature.

CHARLES M. SPANGLER.